(12) United States Patent
Genda

(10) Patent No.: US 8,970,906 B2
(45) Date of Patent: Mar. 3, 2015

(54) INFORMATION PROCESSING APPARATUS, RECORDING MEDIUM, AND CONTROL METHOD

(71) Applicant: Canon Kabushiki Kaisha, Tokyo (JP)

(72) Inventor: Mariko Genda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/103,710

(22) Filed: Dec. 11, 2013

(65) Prior Publication Data

US 2014/0168676 A1    Jun. 19, 2014

(30) Foreign Application Priority Data

Dec. 13, 2012 (JP) ................................ 2012-272336

(51) Int. Cl.
*G06F 3/12* (2006.01)

(52) U.S. Cl.
CPC ............ *G06F 3/1208* (2013.01); *G06F 3/1255* (2013.01); *G06F 3/1285* (2013.01)

USPC .......................... 358/1.9; 358/1.13; 358/1.18

(58) Field of Classification Search
None
See application file for complete search history.

(56) References Cited

U.S. PATENT DOCUMENTS

| | | | |
|---|---|---|---|
| 2002/0051166 A1* | 5/2002 | Tomita ......................... | 358/1.13 |
| 2005/0200879 A1* | 9/2005 | Nakagiri et al. ............. | 358/1.13 |
| 2006/0215202 A1* | 9/2006 | Nakata et al. ................ | 358/1.13 |
| 2010/0149598 A1* | 6/2010 | Shiohara ..................... | 358/1.18 |

FOREIGN PATENT DOCUMENTS

JP    2000-298564 A    10/2000

* cited by examiner

*Primary Examiner* — Kimberly A Williams
(74) *Attorney, Agent, or Firm* — Canon U.S.A., Inc., IP Division

(57) ABSTRACT

An information processing apparatus ignores a second setting in a despooling process and generates a print command based on a first setting even if a change from the first setting to the second setting is received.

10 Claims, 14 Drawing Sheets

RIGHT

LEFT

INFORMATION PROCESSING APPARATUS, RECORDING MEDIUM, AND CONTROL METHOD

BACKGROUND

1. Field

A system of the present disclosure relates to a technique of print setting.

2. Description of the Related Art

A technique that executes print setting in an information processing apparatus is suggested. Japanese Patent Laid-open No. JP 2000-298564 discloses a technique which executes print setting before a processing by spooler, and then changes print setting after the processing by spooler.

However, there is a case that changing print setting between spooling process and despoiling process as Japanese Patent Laid-open No. JP 2000-298564 is undesirable. For example, that is a case that print setting that has to ensure consistency between spooling process and despooling process is changed. Therefore, the purpose of a system of the present disclosure is to ensure consistency of print setting between spooling process and despooling process.

SUMMARY

According to an aspect of the present invention, an information processing apparatus includes a reception unit configured to receive a change of a print setting from a first setting to a second setting, a determination unit configured to determine whether a common processing that is common in a spooling process and a despooling process is executed as the spooling process or the despooling process, and a generation unit configured to generate a print command based on the first setting after determining the print setting by the first setting that is received in a case that it is determined that the common processing is executed as the spooling process, or after ignoring the print setting by the second setting that is received in a case that it is determined that the common processing is executed as the despooling process.

Further features of the present disclosure will become apparent from the following description of exemplary embodiments with reference to the attached drawings.

DESCRIPTION OF THE EMBODIMENTS

The present embodiment is explained based on a configuration which that includes a common processing that executes a processing based on a spooling process and despooling process, and can change a print setting which is referred by the common processing between the spooling process and the despooling process. In this configuration, there is a possibility that affects the common processing when the print setting is changed between the spooling process and the despooling process.

In respect to an above-mentioned case that affects the common processing, an example of a rotation direction that a document in a landscape direction is rotated to a document in a portrait direction (landscape rotation direction) and a sheet is discharged is explained.

FIG. 1 is an example of print data 1101 for a print medium in a case that a document in the landscape direction is rotated to a document in the portrait direction and a sheet is discharged. The print medium 1102 is illustrated in the landscape direction for explanation purposes. An application arranges the print data 1101 in the landscape direction to a printable area 1104 rotated from a printer driver (spooling process).

Figure 1A:
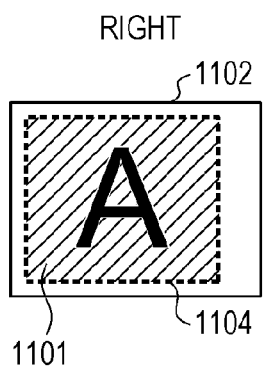
FIGS. 1A to 1C are conceptual diagrams when rotating a document in a landscape direction to a document in a portrait direction and discharging sheet.
Figure 1B:
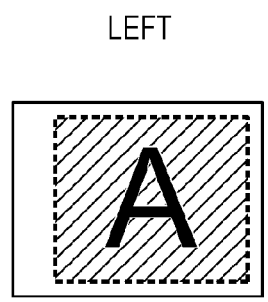

FIG. 1A is an example of a case that the print data 1101 is rotated right 90 degrees. FIG. 1B is an example of a case that the print data 1101 is rotated left 90 degrees. The printable area of FIG. 1A and that of FIG. 1B are different when making directions of the print data 1101 the same.

A printable area 1104 differs depending on the landscape rotation direction. This is due to the margin of a side feed at first is larger than that of a side discharged at last in a longer direction from a standpoint of mechanical control in an ink jet printer.

Figure 1C:
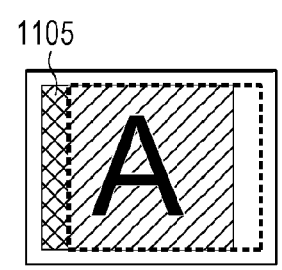

FIG. 1C is an example of print medium output, in a case that the print data which is rotated right 90 degrees is generated by the spooling process, and a printing command which is rotated left 90 degrees is generated by the despooling process. An application arranges the print data 1101 to the printable area 1104 when rotating right 90 degrees. On the other hand, the printer driver executes a print processing as the printable area 1104 when rotating left 90 degrees. As a result, the problem that is the print command 1105 which is generated based on the print data 1101 arranged out of the printable area is not printed on the print medium 1102 and the print command is lacked is occurred.

An example of a configuration to solve the problem was explained mainly is explained below.

Figure 2:
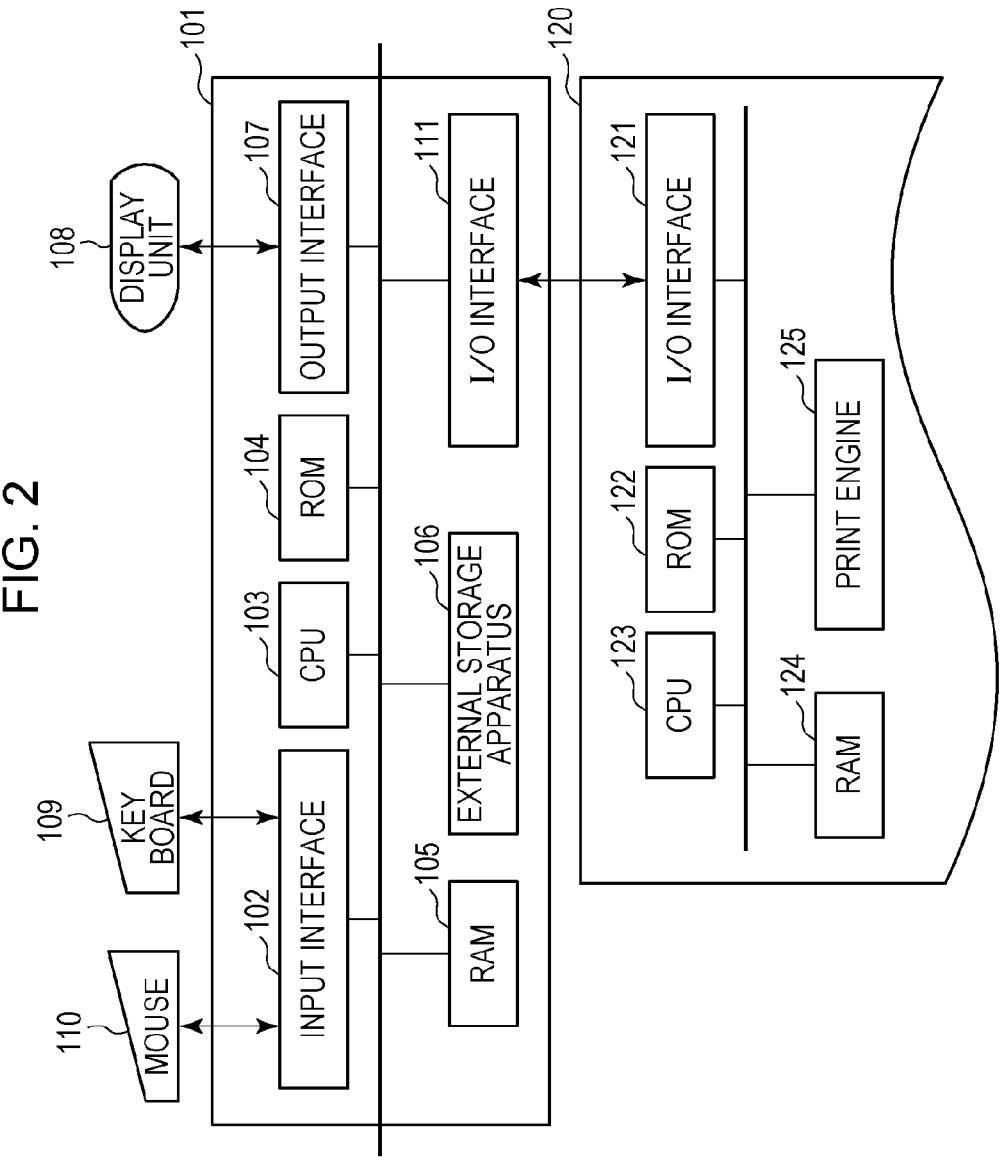
FIG. 2 is a block diagram of printing system comprised by a printer and an information processing apparatus.

FIG. 2 is a block diagram showing hardware configuration of a print system of an embodiment of the present specification. An information processing apparatus 101 has an input interface 102, a central processing unit (CPU) 103, a read only memory (ROM) 104, a random access memory (RAM) 105, an external storage apparatus 106, an output interface 107, a display unit 108, a keyboard 109, a mouse 110, and an I/O interface 111. An initial program is stored in ROM 104, an application program group and an Operating System (OS), a print driver, and various kinds of programs are stored in the external storage apparatus 106. RAM 105 is used as a work memory by various kinds of problems stored in the external storage apparatus 106.

A printer 120 is an image processing apparatus which has an I/O interface 121, a ROM 122, a CPU 123, a RAM 124, and a print engine 125. I/O interface 121 is connected with I/O interface 111 of the information processing apparatus 101. Any method for connecting the printer 120 and the information processing apparatus 101 is applicable. For example, the connection can be via Universal Serial Bus (USB), Local Area Network (LAN), internet, or wireless communication. The RAM 124 is used as a main memory and a work memory of the CPU 123, and stores a receiving buffer and various kinds of data for storing a received print job once. The print engine 125 executes printing based on data stored in the RAM 124. Various kinds of programs are stored in ROM 122. CPU 123 controls each of the units of the printer 120 according to the control programs.

Here, shared processing of the information processing apparatus 101 and the printer 120 is explained like above as an example. However, besides this embodiment, other embodiment is no matter.

The CPU (control means) 103 performs processing based on the programs stored in the external storage device 106, whereby a software configuration of the information processing apparatus 101 illustrated in FIG. 2 and processing of the steps of flowcharts to be described below are implemented.

Embodiment 1

Figure 3:
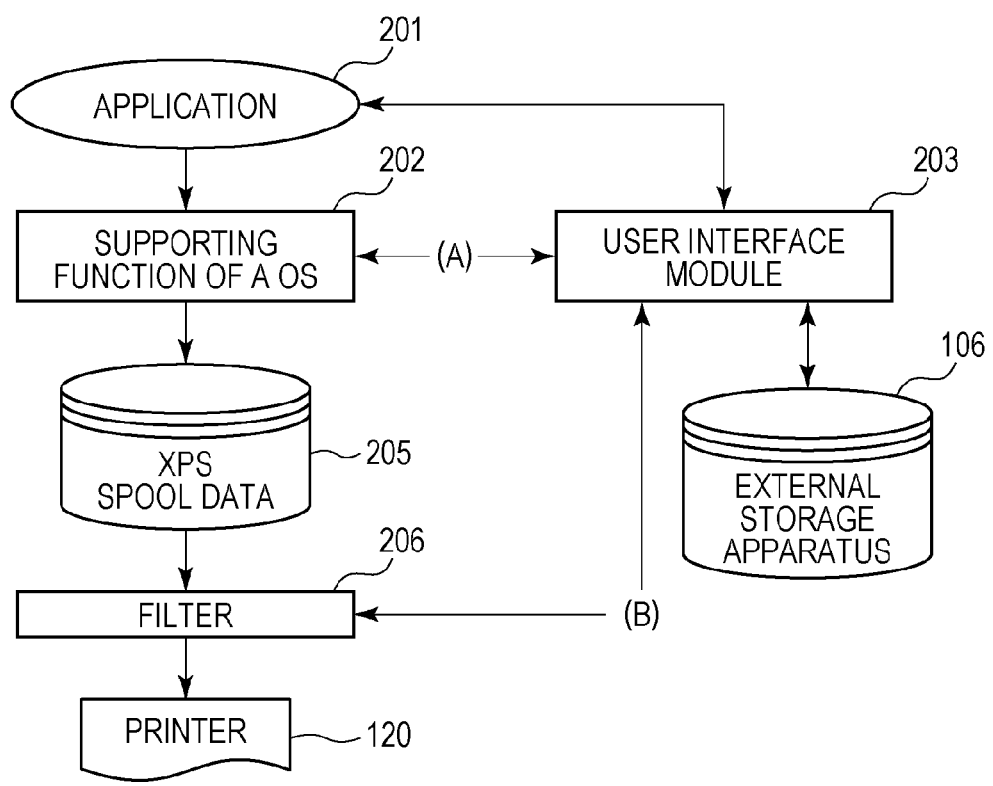
FIG. 3 is a block diagram of printing system of a first embodiment.

FIG. 3 is an example of a block diagram showing a configuration of a print system according to the present embodiment. Hereinafter, the environment in which print system is described includes Microsoft® Windows® as the OS, and the XML Paper Specification (XPS) document format.

An application 201 makes a document and inquires functions of the printing system of a user interface module 203 to print the document. The document is stored temporarily in the external storage apparatus 106 as XPS spooling data 205 through a print supporting function 202 of the OS (spooling process). Rendering information to let the printer 120 execute printing and the print setting is included in the XPS spooling data.

A filter 206, which is a part of a printer driver in a filter pipeline (not shown in the figures) that is a service of the OS, converts the data to a printing command and provides the data to the printer 120 to print (despooling process). The spooling process and the despooling process are operated as different processes, are not limited to be operated one after another.

A filter 206 has a function that reads the print setting and XPS part from a XPS spool data when printing, converts it to a print command that the printer 120 can interpret, provides to the printer 120. The filter 206 is called from the print supporting function 202 of the OS when despooling the spooled print data. A setting consistency processing of the user interface module 203 is called, is converted to the print command that the printer 120 can interpret, and is submitted to the printer 120. The print setting consistency processing is described below.

A user interface module 203 provides a function that receives the print setting, e.g., sheet size, to be used and print direction, ensures consistency of the set value and data, and returns the set value and the data. This function is realized by the print setting consistency processing. The print setting consistency processing does a processing to solve a conflict of the print setting or does a merge processing that combines a print ticket attached to layers of XPS. Those two processing may be executed, one of those may be executed. In the print setting consistency processing of the present embodiment, as described below, besides the above-mentioned two processing, the landscape rotation direction is controlled to only be used in the spooling process. The print setting consistency processing in the present embodiment is a common processing that is commonly executed in the spooling process and the despooling process. In addition, the print setting consistency processing is executed when the print setting is received at the user interface of the user interface module 203.

The user interface module 203 has a function that stores information to decide at least one print setting (hereinafter, print information) in the external storage apparatus 106. Furthermore, the user interface module 203 has a function that refers to the print information stored in the external storage apparatus 106, decides and updates the print information, and returns to the application 201, when executing a print setting consistency processing.

The print setting consistency processing is a common processing which is called from the application 201, the user interface of the printer driver, and the filter 206.

It is able to update the print setting by a fixed value with ensuring the consistency in the whole print workflow, by referring to the print information stored in the external storage apparatus 106, and deciding and updating the print information.

A user interface module 203 has an interface that can change the print information stored in the external storage apparatus 106.

Figure 12A:
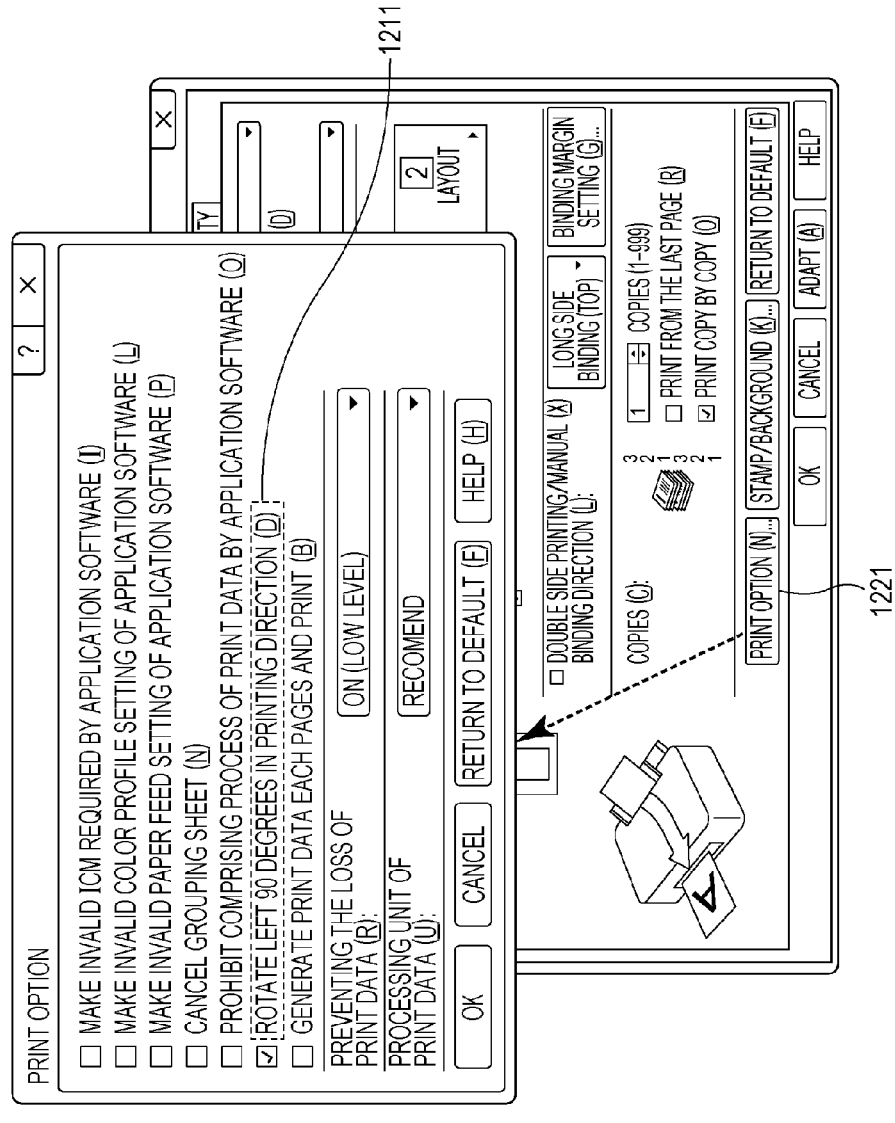
FIGS. 12A and 12B are diagrams showing a user interface of a user interface module.
Figure 12B:
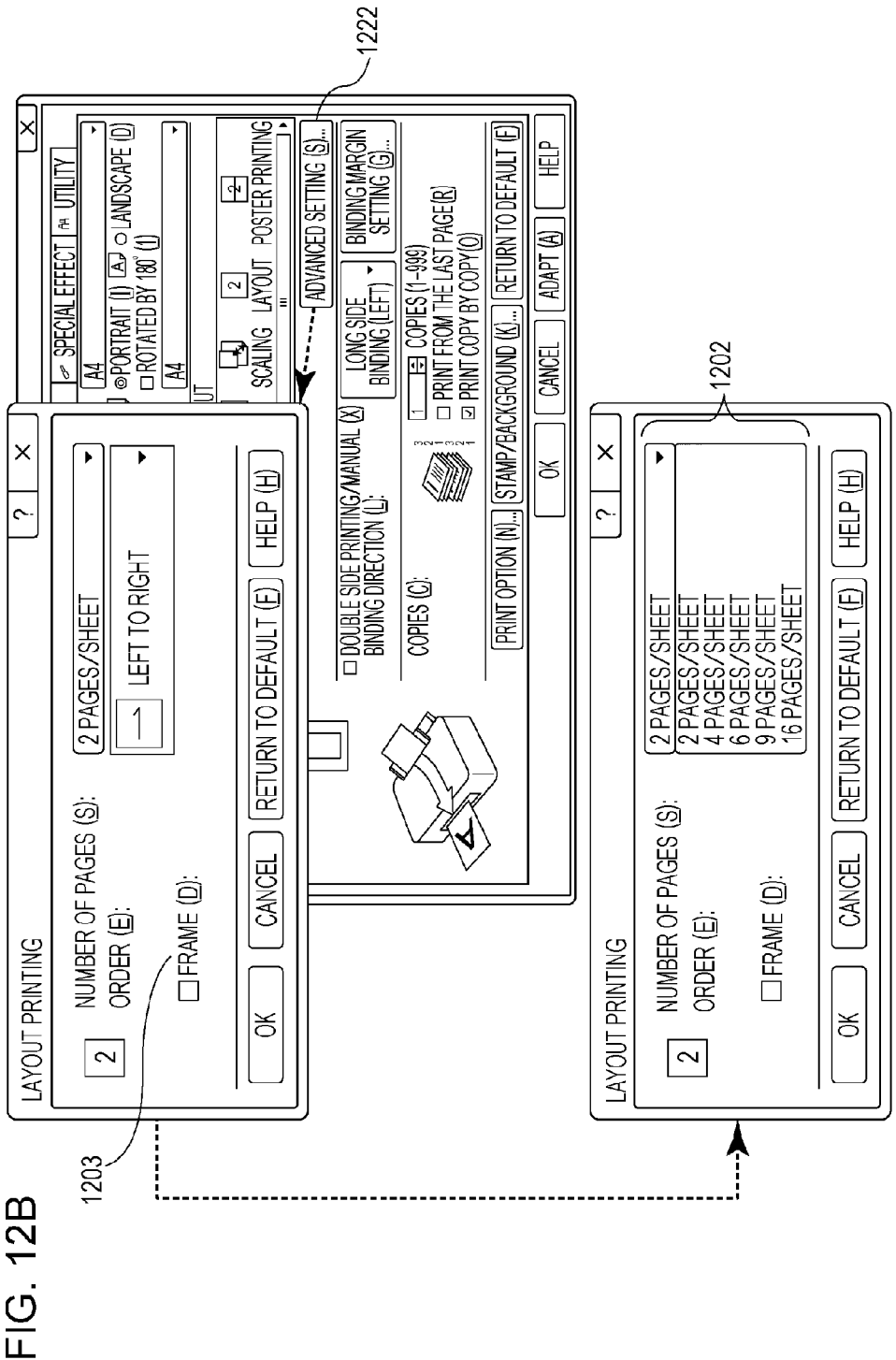

FIGS. 12A and 12B are diagrams showing a user interface of the user interface module 203.

FIG. 12A shows that a print option dialog is opened by selection of a print option button 1221. Setting a change of the landscape rotation direction is achieved by a landscape rotation direction control 1211 of the print option dialog.

Figure 13:
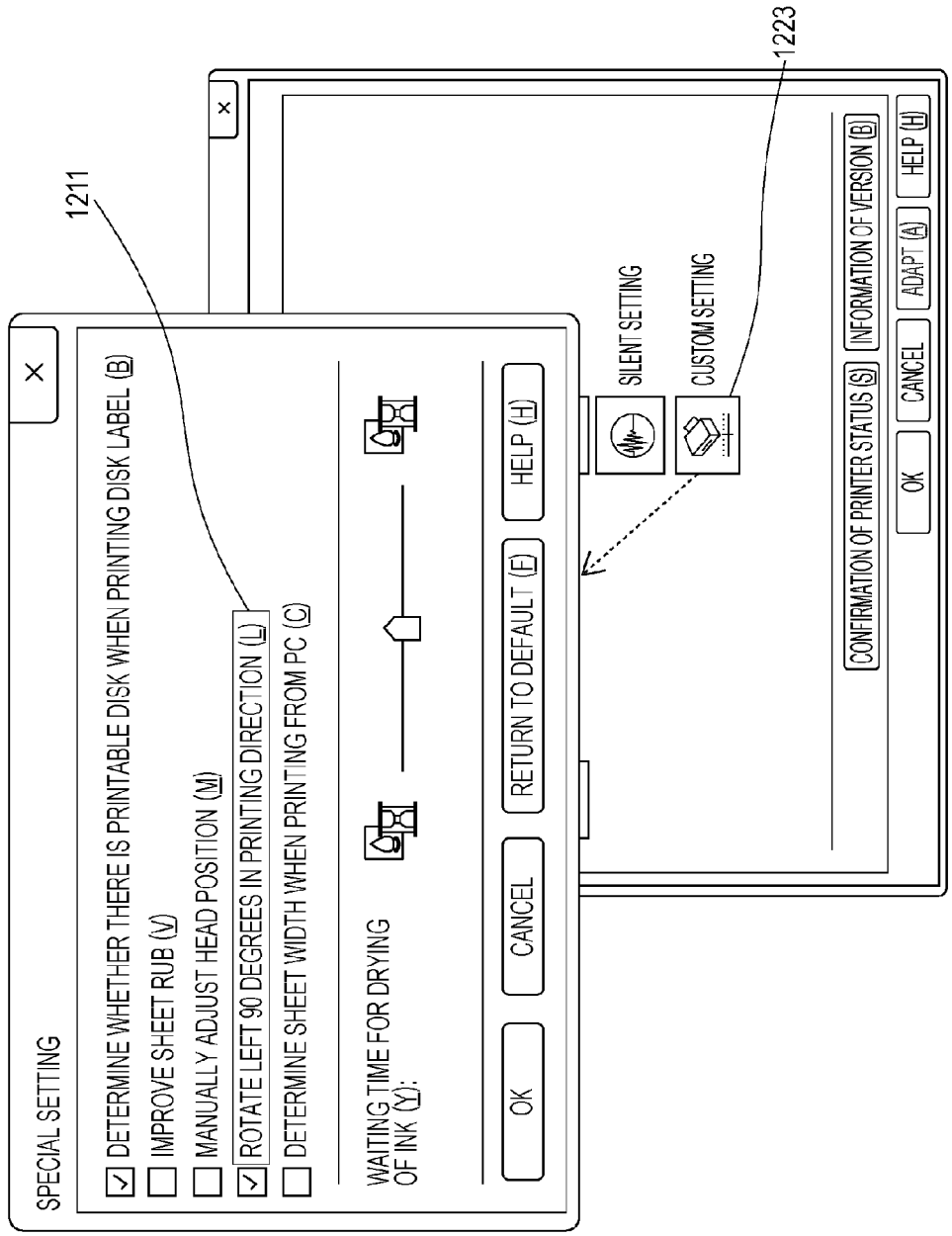
FIG. 13 is other diagram showing a user interface of a user interface module.

FIG. 12A may be configured like FIG. 13. FIG. 13 shows that a setting special dialog is opened by selection of a special setting button. Changing of setting of the landscape rotation direction is achieved by using a landscape rotation direction control 1211 of the special setting dialog.

Print setting for every printing can be set from the application 201 via the user interface of the user interface module 203. Common print setting (default print setting), which is not changed for every application 201, can be also be set.

Furthermore, the print setting may be configured for being able to be changed by calling of an application a user interface module 203. By this configure, the common print setting which is instructed by a user can be ignored, only when the printing by a specific application.

In concrete terms, it supposed that the landscape rotation direction is set up rotation to the left by 90 degrees as the above-mentioned default print setting, by using of the user interface of the user interface module 203. On the other hand, it supposed that the landscape rotation direction is specified a rotation to the right by 90 degrees by the specific application to print. For this case, the specific application calls the user interface module 203 to specify the landscape rotation direction the rotation to the right by 90 degrees. By this, the rotation to the left by 90 degrees is ignored, and is changed to the rotation to the right by 90 degrees instead.

Figure 5:
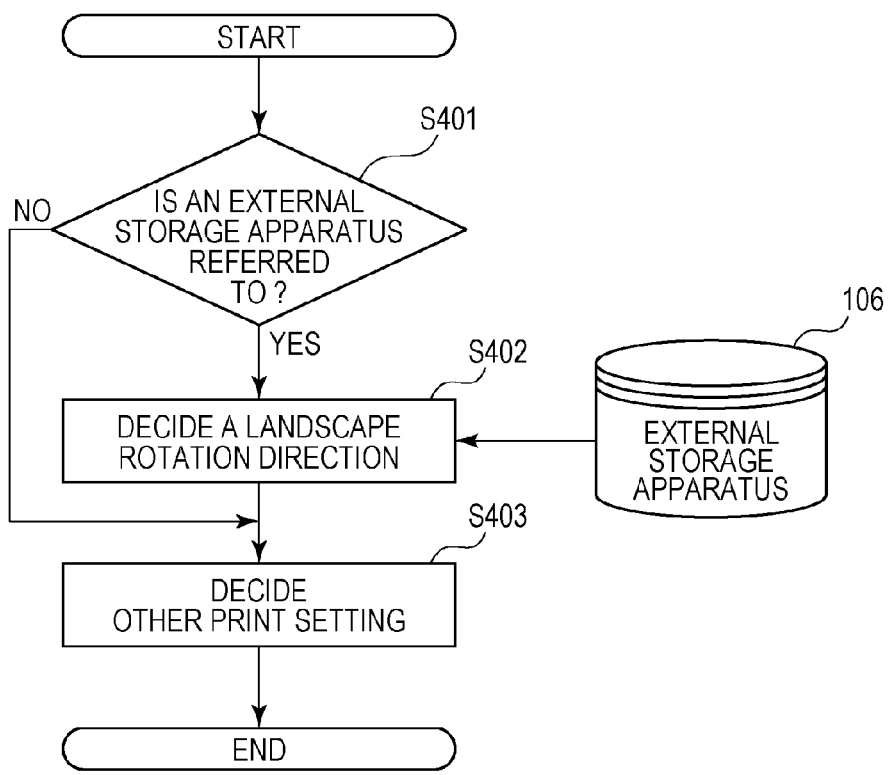
FIG. 5 is a flowchart showing print setting consistency processing according to the first embodiment.

FIG. 5 is a flowchart showing a part of the print setting consistency processing executed in the user interface module 203. FIG. 5 is a flowchart concentrating on a part to be processed according to the external storage apparatus 106, omits the other processes.

At first, it is used to explain a case that the print supporting function 202 calls the print setting consistency processing like FIG. 3A.

A user interface module 203 judges whether or not refer to the external storage apparatus (S401). For executing this judgment, the user interface module 203 refers to external storage apparatus reference information, in the concrete terms.

In the present specification, the external storage apparatus reference information is a part of the print setting. The external storage apparatus reference information is information to refer to the print information stored in the external storage apparatus 106 and specify whether or not decide the print setting, in the print setting consistency processing executed by the user interface module 203. In the present embodiment, the external storage apparatus reference information is set up by the filter 206, but may be set up by the application which can set up printing.

The external storage apparatus reference information is set up by the filter 206 in the despooling process as referred to hereinafter. Therefore, The external storage apparatus reference information does not exist, when the print setting consistency processing is executed as the spooling process (that is, is executed in a calling path of FIG. 3A). This means that judgment of the step S401 is "Yes" if the print setting consistency processing is executed as the spooling process, judgment of the step S401 is "No" if the print setting consistency processing is executed as the despooling process. That is, the step S401 is equal to a process which judges that the print setting consistency processing is executed as the spooling process or the despooling process.

In a case that the external storage apparatus reference information does not exists or to refer to the external storage apparatus 106 is decided in the step S401, the print setting is decided and updated, by referring to the print setting from the external storage apparatus 106.

In concrete terms, it is supposed that the user interface module 203 set up the Landscape rotation direction to the rotation to the left by 90 degrees. For this case, in the step S402, the Landscape rotation direction is decided to the rotation to the left by 90 degrees.

After that, the print setting that consistency of other print setting is ensured is decided and updated (S403), and the print setting consistency processing is completed.

Figure 4:
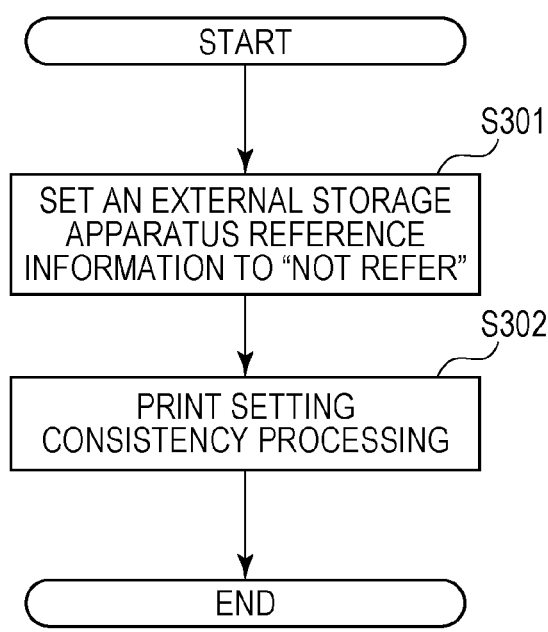
FIG. 4 is a flowchart showing filter processing according to the first embodiment.

FIG. 4 is a flowchart showing a part of a processing that the filter 206 calls the print setting consistency processing in the despooling process. The external storage apparatus reference information is set to "not refer", in the period after the filter 206 is called from the print supporting function 202 of OS and before the first print setting consistency processing is called. In a case that the external storage apparatus reference information does not exist in the print setting, the filter may add the external storage apparatus reference information newly. In concrete terms, it is can be considered that an area that the external storage apparatus reference information can be set is provided in a print ticket which is an example of the print setting, and the external storage apparatus reference information of that area is set to "not refer".

After that, the filter 206 calls the print setting consistency processing of the user interface module 206 (S302), receives the print setting that consistency is ensured, and continues a subsequent filter processing.

The print setting consistency processing which is called in step S302 is explained, by using of FIG. 5. That is, it is a case that the filter 206 calls the print setting consistency processing like FIG. 3B.

In step S401, it is judged that the external storage apparatus reference information is set to "not refer". By this, it is judged that the print setting consistency processing is executed as the despooling process.

Therefore, the step S402 is not executed and the process proceeds to a step S403, as a result of judgment in S401.

An effect which is achieved by this is explained in concrete terms. For example, it is supposed that the Landscape rotation direction is changed the rotation to left by 90 degrees to the rotation to right by 90 degrees by a user, by using of the user interface of the user interface module 203, in the middle of FIG. 3A and FIG. 3B. For this case, the Landscape rotation direction is decided the rotation to left by 90 degrees once, in the print setting consistency processing called in the path of FIG. 3A. Therefore, in the print setting consistency processing called in the path of FIG. 3B, changing to the setting which is the rotation to right by 90 degrees can be ignored, and the processing can be executed consequently based on the setting of the rotation to left by 90 degrees.

By the present configuration, the print setting can be updated by a fixed value with ensuring the consistency in a whole of the print flow. By setting of the filter 206 the external storage apparatus reference information to "not refer", in a case that the print information is updated stored in the external storage apparatus 106 after the spooling process, the consistency of the print setting can be ensured in a whole of the print processing.

In the spooling process and the despooling process, the print setting consistency processing of the user interface module 203 is a common flow as shown in FIG. 5. Therefore, an opening problem can be solved, even if the print setting consistency processing must be common in the spooling process and the despooling process. This means that it is easy that the processing is adopted in a driver configuration which is difficult to customize for a vendor, such as inbox driver.

The external storage apparatus reference information, which is a judgment standard in step S401, is added by the filter 206. Therefore, even if name of a parent processing is changed by specification change as like, the judgment of step S401 can be executed regardless of the specification change, in a comparison with an example that is judged based on name of the parent processing in the embodiment 5 as below-mentioned. By this, a configuration which has a high toughness can be provided.

Embodiment 2

In the embodiment 1, the filter 206 sets the external storage apparatus reference information, judges whether or not the print setting consistency processing is executed in the despooling process, and differs a process.

However, the problem shown in FIG. 1 can be solved, by a configuration as next. That is, the user interface module 203 provides the print setting consistency processing, which are different from the spooling process and the despooling process. If the filter 206 does not call the print setting consistency processing of the spooling process, but can call the print setting consistency processing of the despooling process, it is not necessary of the filter 206 to set the external storage apparatus reference information.

Therefore, in the present embodiment, it is used to explain that the filter 206 calls different the print setting consistency processing in the spooling process and the despooling process.

A whole configuration of the print system in the present embodiment is equal to the embodiment 1, is a configuration equal to the embodiment 1 in points made no reference in particular. And, the processing which is same as the step has been explained is denoted by the number same as the step number has been explained, and the explanation is omitted arbitrarily.

Figure 6A:
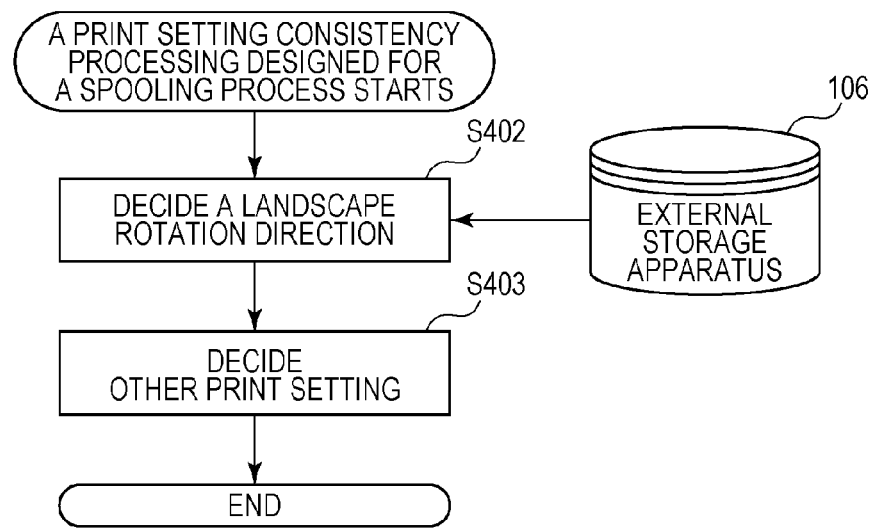
FIGS. 6A and 6B are flowcharts showing print setting consistency processing according to the second embodiment.

FIG. 6A is the print setting consistency processing by the user interface module 203, which is called by the print supporting function of the OS in the spooling process. That is, it is a processing which is called at the path of FIG. 3A and executed.

A point that FIG. 6A is different from FIG. 5 is not to have the step S401. Therefore, the processing of the step S402 is executed, as soon as the print setting consistency processing is called. By this, the Landscape rotation direction is decided.

Figure 6B:
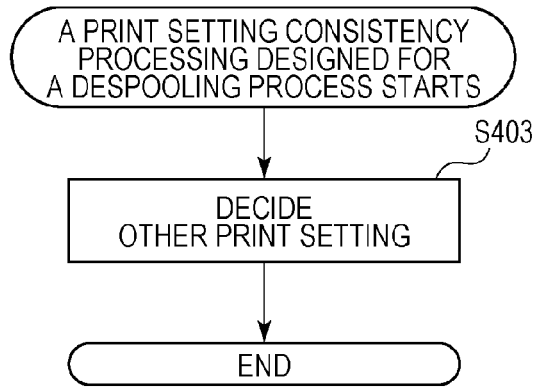

FIG. 6B is the print setting consistency processing by the user interface module 203, which is called by the filter 206 in the despooling process. That is, it is a processing which is called at the path of FIG. 3B and executed.

FIG. 6B does not have the step S402, in comparison with FIG. 6A. Therefore, the processing of the step S403 is executed, as soon as the print setting consistency processing is called. That is, the Landscape rotation direction is not decided and the process is executed.

In the present embodiment, the print setting consistency processing is divided into the process FIG. 6A and FIG. 6B. But, a configuration may be adopted, which is same as the configuration of FIG. 5 and is judged whether or not the predetermined flag is set in an argument of function for calling the print setting consistency processing in the step S401 instead.

In the present embodiment, the consistency of the print setting is ensured through the whole print processing as well as the embodiment 1, even if the filter does not set the external storage apparatus reference information. This configuration is adopted in an outbox driver which is easy to customize.

Embodiment 3

In the embodiment 1, the print information is stored in the external storage apparatus 106. In the present embodiment, the print information is stored in the RAM 124 of the printer 120.

For example, in the embodiment 1, the user interface module 203 acquires the print information from the RAM 124 of the printer 120 in the step S402.

By this, in a case that plural of information processing apparatuses use a printer in common, if the Landscape rotation direction is decided with each printer, information processing apparatuses which use the printer can use a same Landscape rotation direction in common.

If the printer 120 has the external storage apparatus such as Hard Disk Drive (HDD), a storage destination of the print information may be the external storage apparatus.

Embodiment 4

In the present embodiment, besides the Landscape rotation direction, page layout and frame of the page layout is processed as well as the processing of the Landscape rotation direction in the embodiment 1.

FIG. 12B is a dialog showing the user interface of the user interface module 203 in the present embodiment. FIG. 12B shows that layout printing dialog is open by receiving a press of the advanced setting button 1222 by a user. And then, whether or not the frame of the page layout is added is receive from a user, by a page layout frame control 1203 of the layout printing dialog. And specification of page layout is received from a user, by page layout control 1202 of the layout printing dialog.

Figure 8:
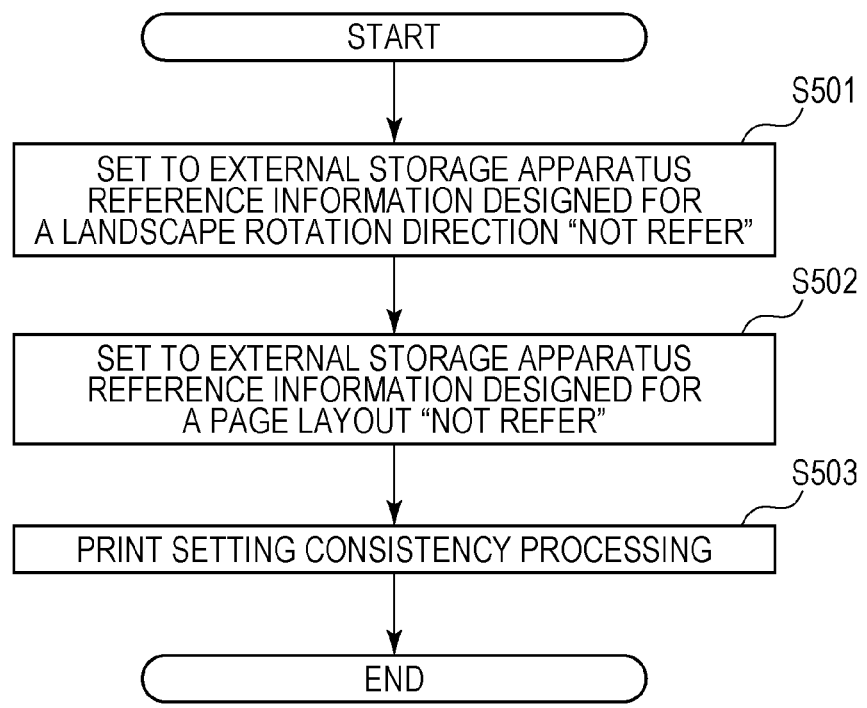
FIG. 8 is a flowchart showing filter processing according to the fourth embodiment.

FIG. 8 is a part of a flowchart until the filter 206 executes the print setting consistency processing of the user interface module 203 in the present embodiment. Process except process with respect to setting of the external storage apparatus reference information is omitted. As shown in FIG. 8, in the present embodiment, the plural of print setting exists which refer to the external storage apparatus 106, such as the Landscape rotation direction, the page layout, and the frame of the page layout. A whole configuration of the print system in the present embodiment is equal to the embodiment 1, is a configuration equal to the embodiment 1 in points made no reference in particular.

The filter 206 sets the external storage apparatus reference information designed for the Landscape rotation direction to "not refer" (S501), and sets the external storage apparatus reference information designed for the page layout to "not refer" (S502). And then, the filter 206 calls the print setting consistency processing of the user interface module 203 (S503), receives the print setting with ensuring the consistency, and continues the filter processing. The external storage apparatus reference information which is added with the print setting can be added with each print setting, as like this. Or it can be operated for the plural of print setting.

Figure 9:
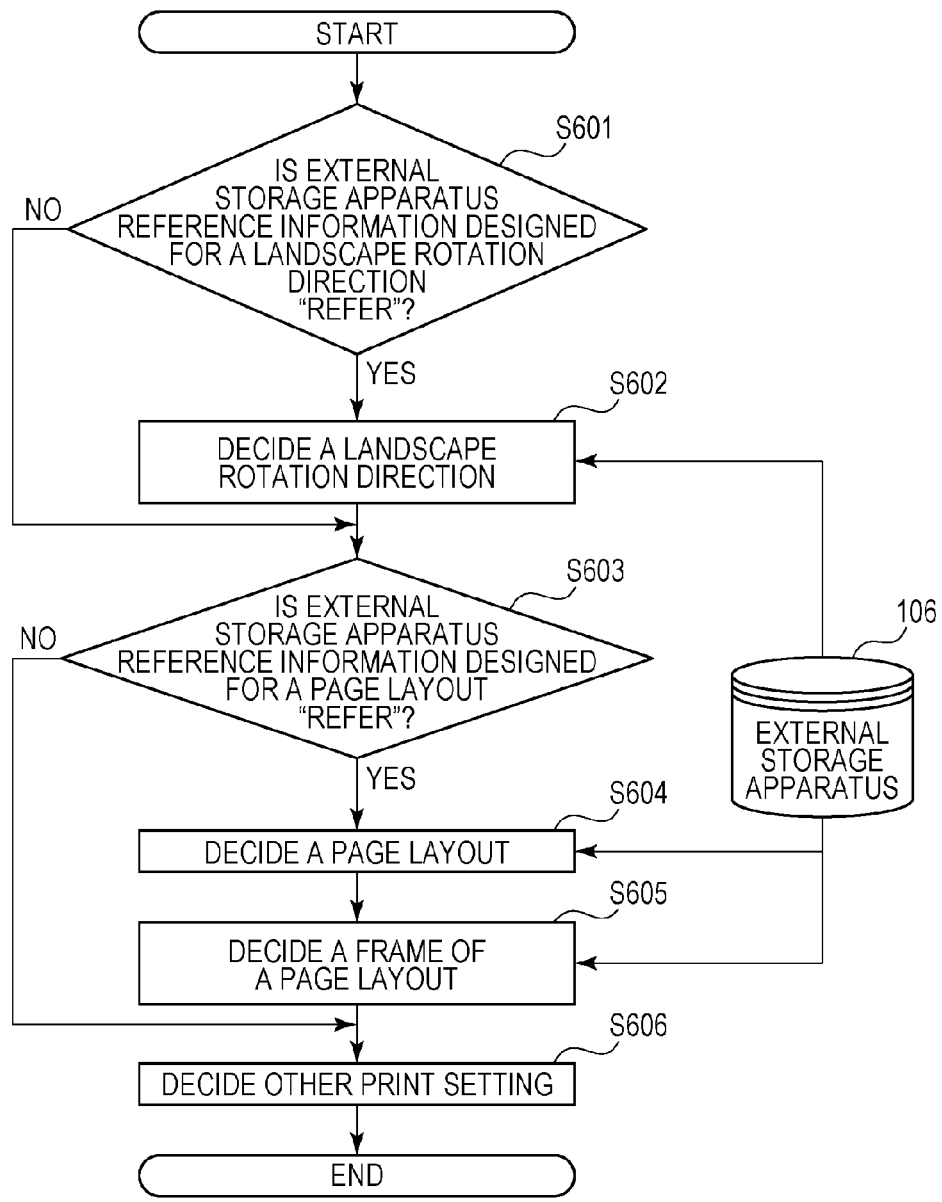
FIG. 9 is a flowcharts showing print setting consistency processing according to the fourth embodiment.

FIG. 9 is a flowchart showing a part of the print setting consistency processing, which is executed by the user interface module 203. At first, the user interface module 203 executes a judgment of the external storage apparatus reference information designed for the Landscape rotation direction (S601).

In a case that the external storage apparatus reference information does not exist or "refer to the external storage apparatus 106" is judged in the step S601, the print information for deciding the Landscape rotation direction is referred from the external storage apparatus 106, the Landscape rotation direction is decided, and the print setting is updated (S602).

Next, the user interface module 203 executes a judgment of the external storage apparatus reference information designed for the page layout (S603).

It is used to explain With respect to a case that the external storage apparatus reference information does not exist or "refer to the external storage apparatus 106" is judged in the step S603, it is used to explain. For this case, the print information for deciding the page layout is referred from the external storage apparatus 106, the page layout and the frame of the page layout are decided, and the print setting is updated (S604 to S605).

After that, the print setting that the consistency of other print setting is ensured is decided and updated (S606), the print setting consistency processing is completed. The print setting consistency processing which is referred in S604 and S605 may be same.

By this, the processes of S602, S604, and S605 are executed in the spooling process. But those processes are not executed in the despooling process.

By the present embodiment, with respect to the print setting items of the print information, which is larger than the embodiment 1, the consistency of the print setting is ensured through whole of the print processing, even if the print information stored in the external storage apparatus 106 after the spooling process.

Embodiment 5

In the configuration of the embodiment 1, it could be considered that the user interface module 203 recognizes the parent process and judges whether refer to the external storage apparatus 106 or not, without adding the external storage apparatus reference information to the print setting.

A whole configuration of the print system in the present embodiment is equal to the embodiment 1, is a configuration equal to the embodiment 1 in points made no reference in particular.

Figure 10:
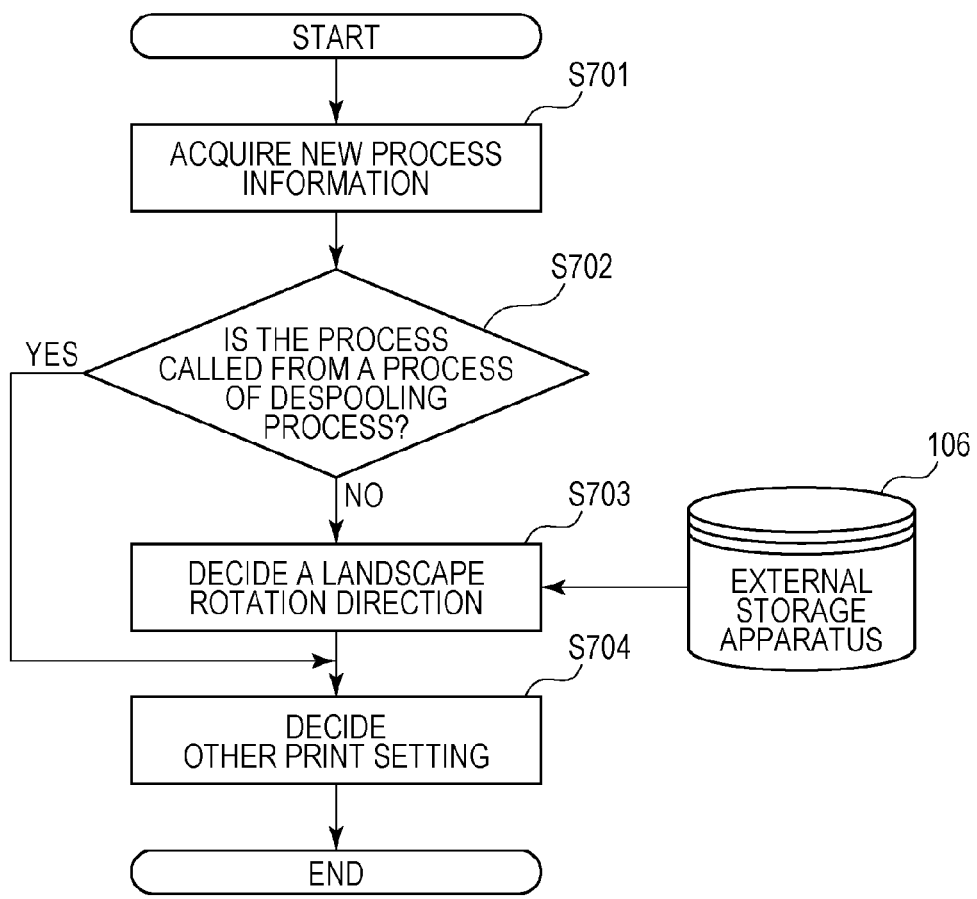
FIG. 10 is a flowcharts showing print setting consistency processing according to the fifth embodiment.

FIG. 10 is a part of a flowchart that the user interface module 203 executes the print setting consistency processing. This flowchart is a flowchart focused on the process executed according to the external storage apparatus 106, and other part is omitted.

The user interface module 203 acquires a process information of the parent process before starting the print setting consistency processing (S701). The information is acquired for this time may be ID or name, if the information can be identified. Whether or not the process is called from the process in the despooling process is judged, from the process information acquired in the step S701. This judgment is realized by the method which judges whether or not the name of the parent process acquired in S701 is a process name of a existing system which is used in the despooling process, as like.

In a case that it is judged that the process is called from the process except the despooling process, the Landscape rotation direction is decided by referring to the print information stored in the external storage apparatus 106, and the print setting is updated (S703). In a case that it is judged that the process is called from the despooling process, the step S703 is not executed. After that, the print setting that the consistency of other print setting is ensured is decided and updated (S704), the print setting consistency processing is completed.

By the present embodiment, the print setting can be updated with ensuring the consistency for whole of the print flow, without adding the external storage apparatus reference information to the print setting.

Embodiment 6

In the present embodiment, the method is explained, which solves a problem in a case that the Landscape rotation direction decided once is changed in a halfway, once the Landscape is decided and the spooling process is executed. In concrete terms, to avoid the problem which is explained in FIG. 1, output is executed after rotation by 180 degrees in the despooling process. Hereinafter, the detail is explained by using of a flowchart.

A whole configuration of the print system in the present embodiment is equal to the embodiment 1, is a configuration equal to the embodiment 1 in points made no reference in particular.

Figure 11:
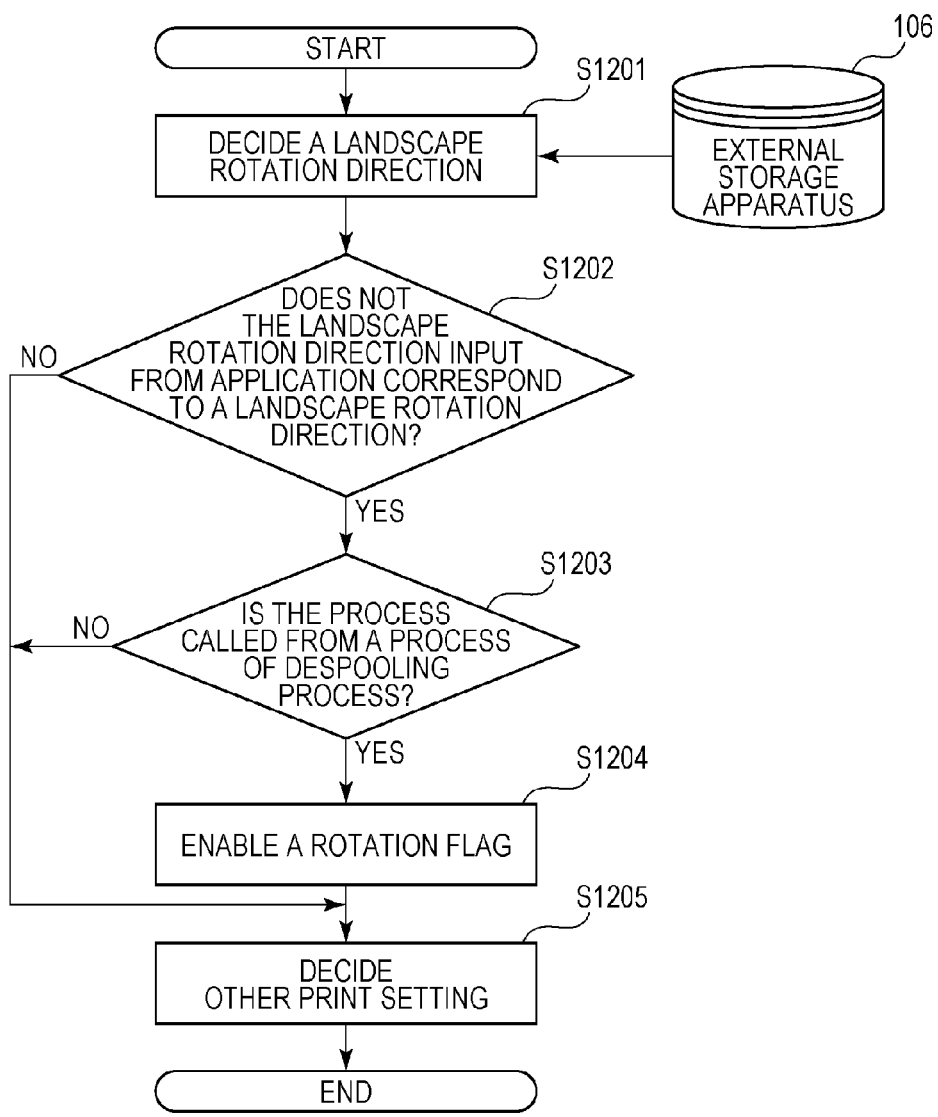
FIG. 11 is a flowcharts showing print setting consistency processing according to the sixth embodiment.

FIG. 11 is a part of a flowchart that the user interface module 203 executes the print setting consistency processing in the present embodiment. This flowchart is a flowchart focused on the process executed according to the external storage apparatus 106, and other part is omitted.

The user interface module 203 refers to the print information stored in the external storage apparatus 106, and decides the Landscape rotation direction (S1021).

The user interface module 203 judges whether or not the Landscape rotation direction decided in S1201 corresponds to a Landscape rotation direction of the print setting Input From the application 201 (S1202).

In a case that the user interface module 203 judges "not correspond", the user interface module 203 judges whether or not the process is called from the despooling process (S1203). This judgment is same as the process of the step S702. In the step S1203, the user interface module 203 only have to judge whether or not the process is called from the despooling process. So the step S1203 may be realized by using the external storage apparatus reference information as the embodiment 1.

In a case that the user interface module 203 judges that the process is called from the despooling process, it enables a setting showing to rotate by 180 degrees (hereinafter, a rotation flag), which is input from the application 201 (S1204).

After that, the print setting that the consistency of other print setting is ensured is decided and updated, the print setting consistency processing is completed (S1205).

Figure 7:
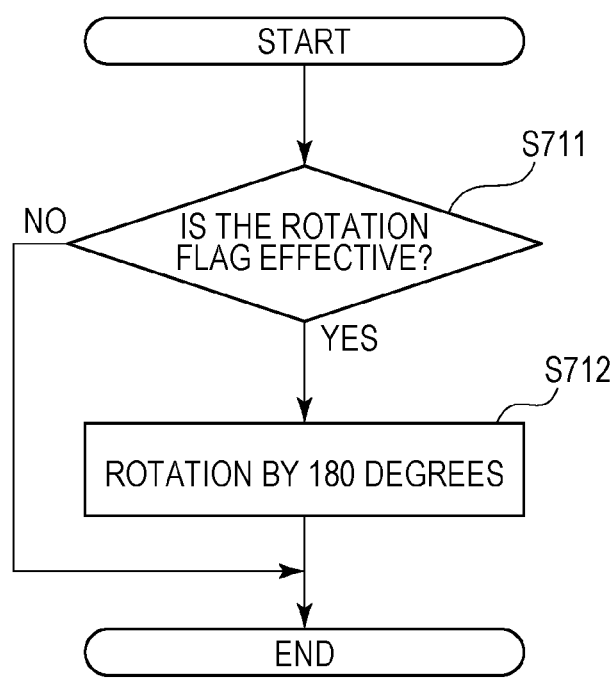
FIG. 7 is a flowchart showing filter processing according to the sixth embodiment.

FIG. 7 is a process that the filter 206 executes as a result of the process by the user interface module 203.

The filter 206 judges whether or not the rotation flag is effective in S711. In a case that the rotation flag is effective as a result of a judgment in S711, the process proceeds to S712. In a case that the rotation flag is not effective, the process that the filter executes is completed in FIG. 7, as a result of the process of the user interface module 203.

In S712, the print data input from the application is rotated by 180 degrees, is arranged to a print medium, and the print command is generated. In this time, it is regarded by the filter 206 that margins on the left, right, top, and bottom which are inverse to the margin of the time that the rotation flag is not effective, and then the filter 206 decides a print area and rotates by 180 degrees. Because, in a case that the rotation flag is effective, the printer driver returns the application 201 the print area which has margins on the left, right, top, and bottom which are inverse to the print area of the time that the rotation flag is not effective. When a rotation function by 180 degrees like this is effective, the print data generated by the application 201 is output with being rotated by the newest Landscape rotation direction, without lacking.

There method below could be considered as the method that the process of the step S712 is realized.

1. rotate a print data input from the application by 180 degrees and render the rotated print data 2. execute rotation by 180 degrees as the same as a rendering.

3. render a print data input from the application without rotating the print data, and output with rotating by 180 degrees by reading by a direction opposite to the ordinary reading direction In the present embodiment, print setting control that the print command is not lacked can be realized, by output is executed after rotation by 180 degrees in the despooling process.

Other Embodiment

The system in the present specification is realized by executing the process below.

That is, the process is a process that a software (a program) that the above-mentioned embodiments is realized is provided to a system or an apparatus via network or various kinds of recording medium, and a computer (or CPU or MPU or as like) of the system or the apparatus reads the program and executes.

By the system of the present specification, the consistency of the spooling process and the despooling process can be ensured.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-272336, filed Dec. 13, 2012, which is hereby incorporated by reference herein in its entirety.

What is claimed is:

1. A control method for generating a print command comprising:
   receiving a change of a print setting from a first setting to a second setting;
   determining whether a common process that is common in a spooling process and a despooling process is executed as the spooling process or the despooling process; and
   generating a print command based on the first setting after determining the print setting by the first setting that is received in a case that it is determined that the common processing is executed as the spooling process, or after ignoring the print setting by the second setting that is received in a case that it is determined that the common processing is executed as the despooling process.

2. The control method according to claim 1, further comprising:
   setting information showing that the common processing is executed as the despooling process;
   wherein when it is determined that the common processing is executed as despooling process, in a case that the setting sets information showing that the common processing is executed as the despooling process.

3. The control method according to claim 1, further comprising:
   acquiring information to decide the print setting from an image processing apparatus.

4. The control method according to claim 1,
   wherein the first setting and the second setting include a plurality of print setting items.

5. The control method according to claim 1, further comprising:
   acquiring a process information of a process that calls the common processing;
   wherein when it is determined that the common processing is executed as the despooling process, the acquired process is a specific process.

6. The control method according to claim 1,
   wherein the first setting is a first rotation direction and the second setting is a second rotation direction that is rotated 180 degrees from the first rotation direction,
   wherein an image processing apparatus which processes based on the print command, sets margins so that a margin of a side fed at first is larger than that of a side discharged at last in a longer direction of a sheet.

7. The control method according to claim 1,
   wherein the common processing includes at least one of a processing to solve a conflict of the print setting, and a merge processing to combine layers of XPS.

8. The control method according to claim 1,
   wherein receiving the change of a print setting includes receiving from the first setting stored in a storage apparatus to the second setting during a print processing.

9. A non-transitory computer readable storage medium storing computer executable instructions for causing a computer to execute a method for generating a print command method comprising:
   receiving a change of a print setting from a first setting to a second setting;
   determining whether a common processing that is common in a spooling process and a despooling process is executed as the spooling process or the despooling process; and
   generating a print command based on the first setting after determining the print setting by the first setting that is received in a case that it is determined that the common processing is executed as the spooling process, or after ignoring the print setting by the second setting that is received in a case that it is determined that the common processing is executed as the despooling process.

10. An information processing apparatus comprising:
    a reception unit configured to receive a change of a print setting from a first setting to a second setting;
    a determination unit configured to determine whether a common processing that is common in a spooling process and a despooling process is executed as the spooling process or the despooling process; and
    a generation unit configured to generate a print command based on the first setting after determining the print setting by the first setting that is received in a case that it is determined that the common processing is executed as the spooling process, or after ignoring the print setting by the second setting that is received in a case that it is determined that the common processing is executed as the despooling process.

* * * * *